United States Patent [19]

Parchet et al.

[11] Patent Number: 4,579,418
[45] Date of Patent: Apr. 1, 1986

[54] PLUG FOR AN OPTICAL-FIBER CONNECTOR AND A CONNECTOR EQUIPPED WITH SAID PLUG

[75] Inventors: Pierre Parchet; Roland Desmurs, both of Suresnes, France

[73] Assignee: Socapex, Suresnes, France

[21] Appl. No.: 506,620

[22] Filed: Jun. 22, 1983

[30] Foreign Application Priority Data

Jun. 22, 1982 [FR] France .................. 82 10906

[51] Int. Cl.⁴ .................. G02B 6/36; G02B 7/26
[52] U.S. Cl. .................. 350/96.20; 350/96.21
[58] Field of Search .................. 350/96.2, 96.21, 96.22

[56] References Cited

U.S. PATENT DOCUMENTS

| | | | |
|---|---|---|---|
| 3,803,409 | 4/1974 | Prochazka | 350/96.21 |
| 4,047,797 | 9/1977 | Arnold et al. | 350/96.21 |
| 4,076,379 | 2/1978 | Chouinard | 350/96.22 |
| 4,140,366 | 2/1979 | Makuch et al. | 350/96.22 |
| 4,205,898 | 6/1980 | Matthews et al. | 350/96.21 |
| 4,258,977 | 7/1978 | Lucas et al. | 350/96.21 |

FOREIGN PATENT DOCUMENTS

| | | |
|---|---|---|
| 0051507 | 5/1982 | European Pat. Off. |
| 2485754 | 12/1981 | France |
| 1545302 | 5/1979 | United Kingdom |
| 2027924 | 2/1980 | United Kingdom |

OTHER PUBLICATIONS

IEEE Transactions on Communications, vol. COM-26, No. 7, Jul. 1978, D. C. Hanson et al., "Integrated transducer Modules, Connectors and Cable for Industrial Fiber Optic Data Links", pp. 1068-1076.

D. Lescene and A. Jacques, New Low Loss Optical Fiber Connectors, Conference: Thirteenth Annual Connector Symposim Proceedings, Philadelphia, Pa. USA (Oct. 8-9, 1980).

Primary Examiner—John Lee
Assistant Examiner—Lester Rushin, III
Attorney, Agent, or Firm—Oblon, Fisher, Spivak, McClelland & Maier

[57] ABSTRACT

A plug mounted on a coupling member comprises an attachment terminal in which at least one optical fiber is accurately positioned at one end. The terminal is abuttingly applied against the downstream end of the plug body by means of a spring but is movably mounted in a "floating" arrangement within the plug body by means of locating keys on the plug body and corresponding grooves in the terminal which is thus given a limited degree of freedom of rotation about its axis. The plug body has at least one locating element for angularly orienting the plug body within the coupling member and is associated with a locking device in order to be rigidly fixed to the coupling member.

11 Claims, 11 Drawing Figures

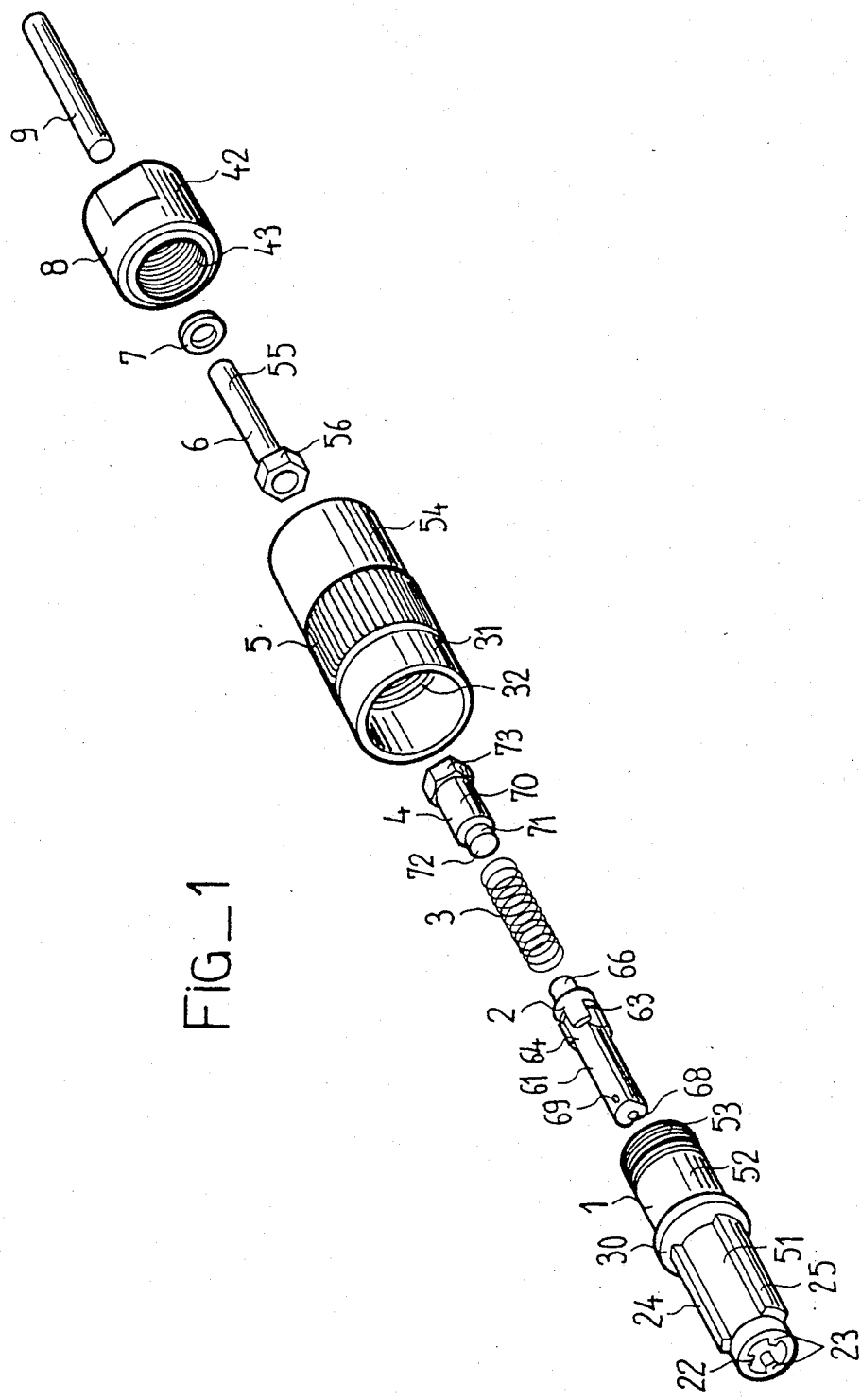
FIG_1

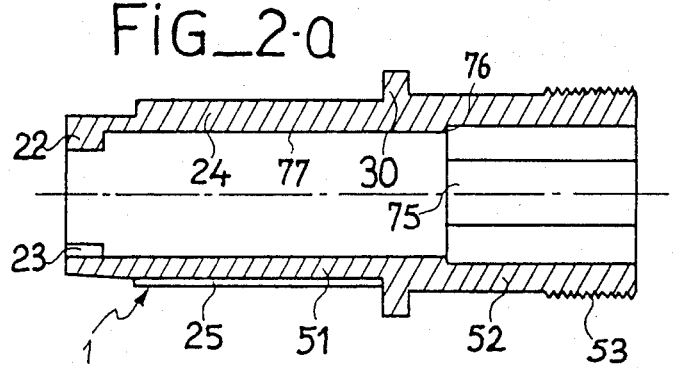
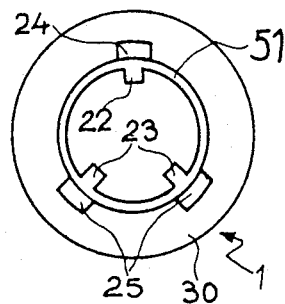
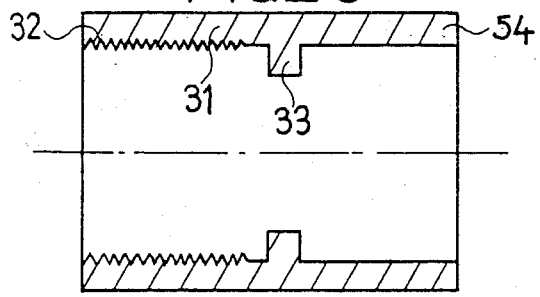
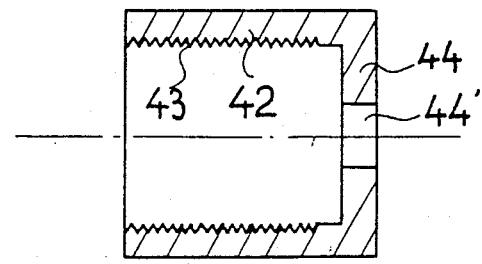
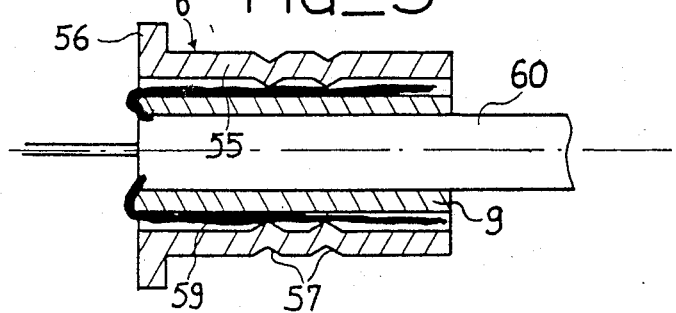

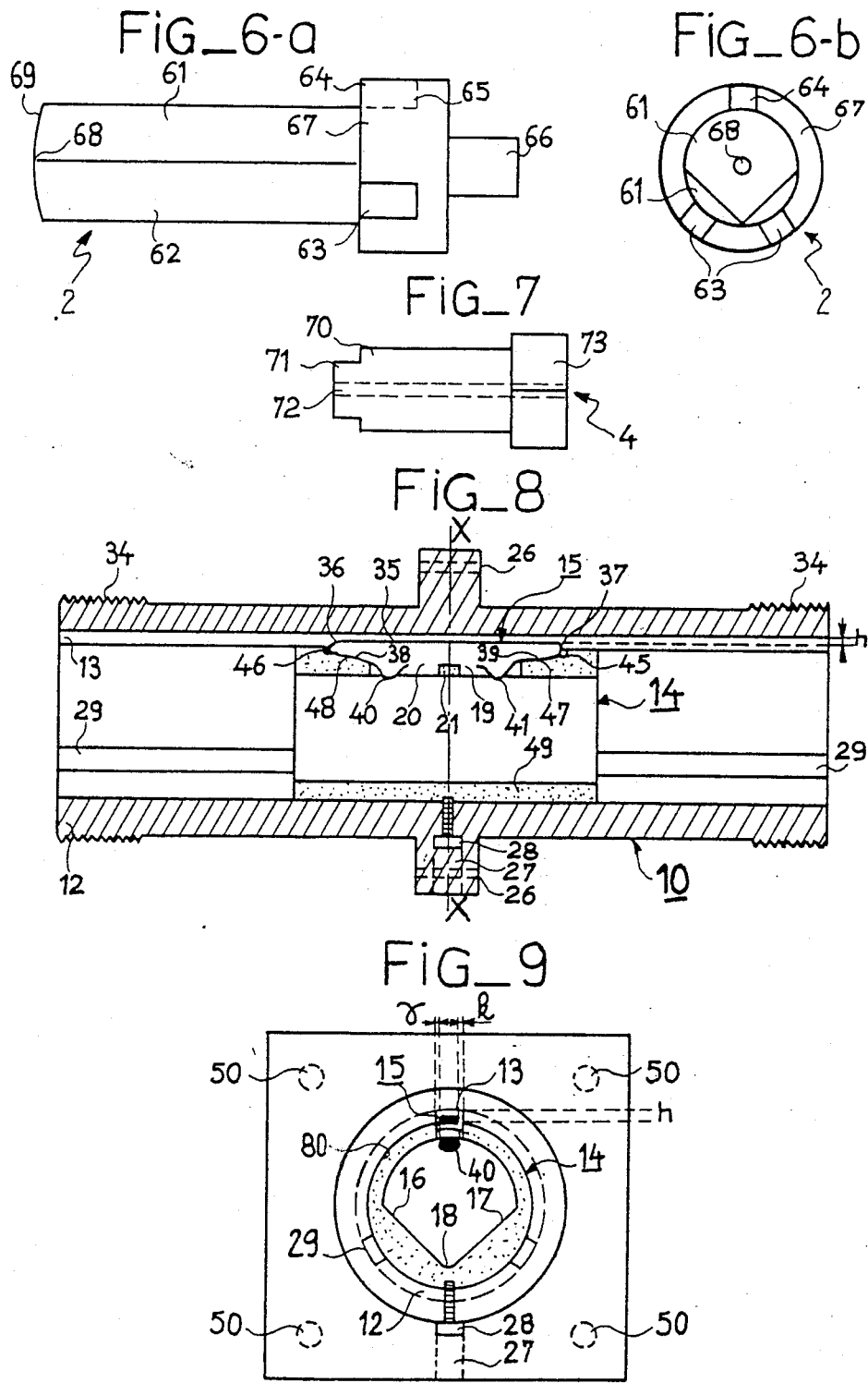

PLUG FOR AN OPTICAL-FIBER CONNECTOR AND A CONNECTOR EQUIPPED WITH SAID PLUG

This invention relates to a plug for an optical fiber connector and to a connector which is equipped with said plug.

European Pat. No. 51 507 has already disclosed an optical fiber connector plug which is intended to be mounted on a coupling member, the connector being provided with an attachment terminal in which at least one optical fiber is accurately positioned at one end and also with a plug body. The attachment terminal and the plug body are provided with means which cooperate in such a manner as to form a "floating" terminal assembly in which said terminal is movably mounted within the plug body. The terminal is abuttingly applied against a downstream end of the plug body by means of a resilient restoring member.

A plug of this type is intended to be employed for the connection of cylindrical attachment terminals.

The object of the present invention is to provide a plug for an optical fiber connector of the above-mentioned type which can also be employed for connecting cylindrical terminals but is more particularly adapted to the connection of terminals of the type in which provision is made for an alignment V-groove.

In accordance with the invention, the attachment terminal is movably mounted within the plug body by means of a plurality of locating keys arranged at the downstream end of the plug body and a corresponding number of grooves formed in the terminal, with the result that the terminal has a limited degree of freedom of rotation about its axis. The plug body is also provided with at least one locating element for angularly orienting the plug body within the coupling member, and the plug body is adapted to cooperate with a locking device for rigidly mounting said plug body on said coupling member.

This particular arrangement of the "floating" or movably mounted attachment terminal endows this latter with all desirable degrees of freedom, namely the degree of freedom of rotation which has been mentioned above but is of limited amplitude in order to ensure an effective positioning and error-preventing action, one degree of freedom of translational displacement by virtue of the fact that the terminal is applied against the plug body as a result of a resilient restoring action, one degree of freedom of translational displacement in a direction parallel to its axis, and the degree of freedom of rotation of the plug with respect to its upstream end by reason of the fact that the cooperating coupling of splines and locating keys constitutes approximately a self-aligning bearing.

In accordance with one embodiment of the invention, the attachment terminal has an annular flange which provides the terminal with an abutment for the locating keys of the plug body and in which said grooves are formed.

The resilient restoring member can be a spring compressed within the plug body by a limiter which is locked within said plug body by a rear nut. A cylindrical ferrule for maintaining the jacket of a cable can have a zone of greater width and can be locked within the plug body by the rear nut. The ferrule is preferably associated with an internal cylindrical sleeve through which the cable jacket is passed and around which is folded an element of the cable jacket which affords resistance to traction, the ferrule and the internal sleeve being crimped together.

The locking device can be capable of longitudinal displacement prior to screwing, the movements of said device being limited at the front end by the plug body in which it produces a locking action and at the rear end by the rear nut. The locking device can be a threaded locking ring which is intended to be screwed on the coupling member, said locking ring being provided with an annular flange which is applied against an annular flange of the plug body in the locking position.

The invention further relates to a connector comprising two plugs such as those defined in the foregoing and a coupling member comprising an alignment device rigidly fixed to a cylindrical coupling body and provided at each end with a screw-thread, and at least a second locating element which is complementary to the first in order to locate and guide the plug within the coupling member.

The alignment device can be provided with a V-section element and with resilient restoring means for applying the V-section elements of each plug terminal against those of the alignment device. The alignment device can be a sleeve mounted within the coupling member. Said device can also be constituted by a section comprising a V-shaped groove which is adapted to cooperate with each coupling terminal. The ends of the side walls of the V-groove are joined to each other so as to form a cavity having a shape which is substantially complementary to that of the corresponding attachment terminal. Resilient means are arranged within the alignment sleeve in substantially overhead relation to the bottom of the V-groove so as to apply each terminal against the bottom of the groove of the alignment sleeve.

The connector which is constructed in this manner is therefore provided in all cases with a plug body rigidly mounted on the coupling member, a floating terminal movably mounted within the plug body and having all desired degrees of freedom, and an alignment device which is not movably mounted within the coupling member.

Other features of the invention will be more apparent to those skilled in the art upon consideration of the following description and accompanying drawings, wherein:

FIG. 1 is a view in perspective showing a plug in accordance with the invention;

FIGS. 2a and 2b are respectively a longitudinal sectional view and a front view of a plug body in accordance with the invention;

FIG. 3 is a longitudinal sectional view of a locking ring in accordance with the invention ;

FIG. 4 is a longitudinal sectional view of a rear nut in accordance with the invention;

FIG. 5 is a longitudinal sectional view of an optical fiber cable crimped by means of an internal sleeve and a ferrule in accordance with the invention;

FIGS. 6a and 6b are respectively a side view and a front view of an attachment terminal in accordance with the invention;

FIG. 7 is a side view of a limiter in accordance with the invention;

FIGS. 8 and 9 are respectively a longitudinal sectional view and a transverse sectional view taken along line X—X, showing a connector in accordance with the invention and comprising a stationary sleeve within a cylindrical union.

The plug illustrated in FIG. 1 comprises a plug body 1 provided at the front end with locating keys 22 and 23 as well as ribs 24, 25 for the purpose of orienting the plug body within the coupling member, and an annular flange 30. An attachment terminal 2 having a V-section element 62 (FIG. 6a) is provided at its downstream end 68 with an optical fiber which is positioned with a high degree of accuracy. The rear end of said attachment terminal is provided with an annular flange 67 and grooves 63 and 64 (FIG. 6a and 6b) formed at the rear end of this latter are adapted to cooperate with the locating keys 22 and 23. The jacket of the optical-fiber cable is held in position by crimping by means of a ferrule 6, an internal sleeve 9 and a washer 7. The ferrule 6 is provided at the front end with an n-sided annular flange 56 (where n=6 in the example considered). A limiter 4 through which the optical fiber is passed is provided at the front end with a recess 71 for a spring 3 and at the rear end with a flange 73 having n sides (where n=6 in the example considered). A locking ring 5 provided with an internal annular flange which is intended to be applied against the annular flange 30 of the plug body is intended to be screwed onto the coupling member by means of its internal screw-thread 32, with the result that the plug body is rigidly locked in the coupling member. The plug is assembled by means of a rear nut 8 having an internal screw-thread 43 which is intended to be screwed on a corresponding external screw-thread 53 of the rear portion of the plug body. Said rear nut which is associated with the washer 7 and provides this latter with a firmer seating, serves to maintain the limiter 4 and the ferrule 6 in position within an n-sided housing (where n=6 in the example considered) which is located at the rear end of the plug body 1, the attachment terminal 2 being held in position in a floating manner by means of the spring 3. The locking ring 5 is capable of longitudinal displacement between the annular flange 30 and the front portion of the rear nut 8.

As shown in FIGS. 2a and 2b, the plug body 1 has a front cylindrical portion 51 provided with splines 24 and 25 for the purpose of orienting the plug within the coupling member. Said splines are composed of two ribs 25 relatively displaced at an angular interval of 90° and of one rib 24 displaced at an angular interval of 135° with respect to each rib 25 in such a manner as to prevent any error of positioning of the plug within the coupling member. Provision is made within the front cylindrical portion 51 and at the end of this latter for locating-keys composed of two keys 23 angularly spaced at 90° and one key 22 spaced at 135° with respect to each key 23. The keys 22 and 23 consist of ribs of small length. The outer ribs or splines 24 and 25 extend to the annular flange 30. The plug body 1 also has a rear cylindrical portion 52 provided with an external screw-thread 53. The rear cylindrical portion 52 is provided over part of its length with a hollow six-sided housing 75 for receiving the flanges 73 and 56 respectively of the limiter 4 (FIG. 7) and of the ferrule 6. The housing 75 extends to the point at which its is joined to an internal cylindrical portion 77 and thus forms a counterbore 76 within which the limiter 4 is abuttingly applied. The length of the housing 75 is therefore equal at a maximum to the sum of the length of the flange 73 and the length of the flange 66.

As shown in FIG. 3, the locking ring 5 comprises a cylinder 31 provided at the front end with an internal screw-thread 32 which extends to an internal annular flange 33, and at the rear end with an extension in the form of a cylindrical end portion 54. When the plug is locked in the coupling member, said end portion forms a cover which partly conceals the rear nut.

In FIG. 4, the rear nut has an internally-threaded cylindrical portion 42 and a rear wall 44 pierced by an axial bore 44' having a larger diameter than that of the cylindrical portion 55 of the ferrule 6.

As illustrated in FIG. 5, the ferrule 6 has a cylindrical portion 55 which terminates in the six-sided flange 56; the internal sleeve 9 of equal length is disposed within the interior of the ferrule 6 and the cable jacket reinforcement elements 59 of material such as aramide fiber, for example (Kevlar) are folded-back over the end of the sleeve 9 and are thus imprisoned between this latter and the ferrule 6 by a crimp 57. The cable jacket 60 does not extend beyond the flange 56.

In FIGS. 6a and 6b, the floating attachment terminal 2 has a front cylindrical portion 61 along which are formed two V-shaped orthogonal cant faces 62. The cylindrical portion 61 terminates in a rounded front end 69 at the center of which an optical fiber is accurately positioned at 68. The rear end of the cylindrical portion 61 has an extension in the form of an annular flange 67 in which are formed grooves 64 and 63. Said grooves are angularly spaced in the same manner as the locating keys 22 and 23. The bottom 65 of the grooves serves to provide the terminal 2 with an abutment against which the keys of the plug body 1 are applied. The grooves 63 and 64 are of slightly greater width than the corresponding keys 23 and 22 respectively, thus endowing the attachment terminal with one degree of freedom of rotation about its axis but limited in amplitude. The annular flange 67 has a rearward extension in the form of a cylindrical portion 66 around which the end of the spring 3 is intended to be placed.

In FIG. 7, the limiter 4 comprises a cylindrical portion 70 which has a forward extension in the form of a cylindrical portion 71 of smaller diameter which is intended to receive the other end of the spring 3. The opposite end of said cylindrical portion is designed in the form of a six-sided flange 73. A bore 72 provides a free passage for the optical fiber. When the plug is assembled, the spring 3 abuttingly applies the terminal 2 against the locking keys of the plug body 1 and a gap remains between the two cylindrical portions 66 and 71 of the terminal and of the limiter. Said gap determines the extent of rearward axial displacement of the floating terminal. Said axial displacement should preferably be limited so as to ensure that, in the position of maximum withdrawal of the terminal, the grooves of said terminal remain engaged within the locating keys of the plug body.

Mounting of a fiber is carried out after all the plug components 1 to 8 have been assembled. The cable jacket is stripped over a given length in order to allow a sufficient length of optical fiber to project, for example a length of about 60 mm. The cable jacket reinforcement elements 59 are folded-back around the internal sleeve 9 which has previously been engaged over the cable jacket. The optical fiber is then caused to slide within the bores of the limiter 4 and of the floating terminal and the cable jacket is inserted in the internal sleeve 9 until it is abuttingly applied within the limiter 4. The crimp 57 is then formed as shown in FIG. 5. Centering of the fiber with respect to the V-section element 62 is then performed by means of an equipment unit of a type known per se, for example of the type which makes use of two V-section positioning elements which are parallel but the axes of which are displaced vertically with respect to each other. The first V-section element receives the end of the terminal and the second V-section element receives the optical fiber which projects from the attachment terminal 2. The terminal 2 and the fiber are maintained in position at the bottom of the V-section elements by means of clamps. The vertical displacement between the V-section elements is chosen so as to ensure that the fiber is accurately positioned at a given point with respect to the edges of the V. The optical fiber is then fixed in position at the end 68 of the terminal by introducing adhesive through a hole 69 formed at the top of the cylindrical portion 61. The fiber is then cut and polished.

The assembled plug therefore comprises a plug body and a floating terminal having one degree of longitudinal freedom by virtue of the restoring spring 3, one degree of freedom in rotation about its axis by virtue of the fact that the grooves 63 and 64 are of greater width than the corresponding locating keys 23 and 22. The terminal also has one degree of freedom in translational displacement parallel to its axis and one degree of freedom of rotation substantially about its rear end by virtue of the mechanical clearance existing on the one hand between the external diameter of the annular flange 67 and the internal diameter 77 of the front cylindrical portion of the plug body 1 and, on the other hand, between the diameter which delimits the bottom of the grooves 63 and 64 of the terminal 2 and the internal diameter in which the locking keys 22 and 23 are inscribed. In practice, the clearances chosen will be in relation to the manufacturing tolerances of the parts forming the connector. In the example which is illustrated, the diameter at the bottom of the grooves 63 and 64 is equal to the diameter of the front cylindrical portion 61 of the terminal 2.

By way of example, in the case of an internal diameter of the internal cylindrical portion 77 of the plug body equal to 5.6 mm and a height of locating keys equal to 0.6 mm, an axial clearance of 1.5 tenths of a millimeter is chosen. The grooves formed in the terminal have a width of 2 mm in respect of a width of keys equal to 1.6 mm so as to permit rotation of the terminal about its own axis. The distance chosen for withdrawal of the terminal will be of the order of 0.6 mm.

Under these conditions, the floating terminal 2 has all the degrees of freedom required for assembly and can therefore be readily mounted in different types of connectors. In particular, the degree of freedom of translational displacement in the axial direction produces a withdrawal of the optical fiber within the plug. The bores of the terminal, of the limiter and of the internal sleeve must therefore have a diameter which is sufficient to ensure that the fiber is capable of sliding freely. If the cable to which the fiber is connected is of the type in which the fibers are mounted freely (within grooves or within tubes), the movement of withdrawal of the optical fiber will be absorbed by the cable without difficulty. On the other end, if the cable is of the type in which the fibers are connected in the conventional manner or in other words practically without any clearance, it will be advisable to provide a region in which the fiber will be placed freely in order to absorb the movement of withdrawal of the fiber without subjecting this latter to stresses. It is in fact known that, beyond a certain threshold value, the stresses exerted on optical fibers and arising in particular from a radius of curvature which is too small cause additional attenuation of transmitted light. In practice, this region (formed within the limiter, for example) will be constituted by a duct having a diameter of 4 mm and a length equal to at least ten times (and fifteen times, for example) the distance of withdrawal of the terminal. It is apparent that, in this alternative embodiment, it will be necessary to limit the distance of withdrawal of the terminal to the smallest value which is compatible with the tolerances of the connector components.

The plurality of degrees of freedom of the floating terminal is particularly advantageous in the case in which the coupling member employed comprises a plug alignment device which is rigidly fixed to the coupling body.

In a first alternative embodiment, the coupling body is a cylinder provided with an alignment V-groove (constituting the alignment device) which is molded directly at the lower portion of the axial bore of the coupling body. A blade spring for each fiber is crimped at the top portion of said bore in order to thrust this latter against the alignment V-groove.

From FIGS. 8 and 9, it is apparent that an alignment sleeve 14 has a V-section groove formed by two walls 16 and 17 which are joined together by a semi-cylindrical wall 80. The essential function of said wall 80 is to rigidify the sleeve and to prevent deformations of the V-groove. At the top of the sleeve, provision is made for two openings 19 and 20 in substantially overhead relation to the bottom portion 18 of the V-groove, said openings being separated from each other by a small tongue 21. Said tongue makes it possible to endow the alignment sleeve 14 with greater rigidity, with the result that the semi-cylindrical wall 80 always maintains the two V-section walls 16 and 17 in position in an effective manner without modifying the angle between said walls during the handling operations to which the alignment sleeve is subjected. A resilient tongue 15 is intended to come into position within the openings 19 and 20 and to cooperate with the alignment sleeve 14.

The coupling body is constituted by a union 10. Said union essentially comprises an externally cylindrical body separated by an annular flange 26 provided with attachment holes 50. The union 10 is provided at the level of the annular flange 26 with a bore 27 having its opening within the interior of the cylindrical cavity of the union so as to permit insertion of a screw 28 for attachment of the alignment sleeve 14.

The union 10 has a substantially cylindrical internal cavity provided with guiding and locating grooves 13 and 29 which extend in a direction parallel to the axis of the cylindrical union 10. The different widths and relative angular positions of said grooves are very precise in order to permit coupling of the plug without any difficulty (as stated earlier).

The position of the resilient tongue 15 will be noted more particularly with reference to FIG. 8. Said tongue is held in position by the lateral flanges of the groove 13. Since the sleeve 14 is rigidly fixed to the union 10 by means of the fixing screw 28, the tongue 15 is maintained longitudinally within the groove 13 by means of flanges 45 and 46 with a predetermined clearance which facilitates the assembly but is limited in order to maintain symmetry of the structure with respect to the axis X—X. The resilient tongue 15 has arms 38 and 39 which, in this embodiment, rest respectively on inclined flanges 48 and 47 of the alignment sleeve 14. Said tongue 15 also has bosses 40 and 41 which, as can readily be understood, project into the internal passage of the alignment sleeve 14 after assembly.

It will also be noted that there is a clearance h between the flat portion 35 of the resilient tongue 15 and the bottom of the groove 13 in the absence of coupling terminals. At the time of introduction of said terminals, the arm 35 which forms the flat portion of the tongue 15 is applied against the bottom of the groove 13. The shape of the bosses and the angle of inclination of the arms 38 and 39 with respect to the flat portion 35 must be sufficient to enable the tongue 15 to perform its function of application of the V-section terminal 23 against the bottom of the groove which is defined by the planes 16 and 17 of the V.

A further noteworthy feature is the fact that the alignment sleeve 14 is secured to the body of the union 10 by means of the screw 28 located substantially opposite to the bottom 18 of the V-groove (as shown in FIG. 9), that said screw is screwed into the sleeve 14 and consequently makes it possible to apply the bottom portion of this latter against the corresponding portion 12 of the union 10. This arrangement ensures that the sleeve 14 is rigidly held in position within the interior of the union 10 and guards against any play of said sleeve along the axis X—X which would be liable to impair the alignment of the terminals 2. In general terms, the sleeve is in fact rigidly fixed to the union beneath the V-groove of the alignment sleeve which has a well-calibrated thickness at that point, thus establishing an intimate contact between the external envelope of the sleeve and the internal envelope of the union substantially along the entire length of the contact generator-line.

A calibrated thickness of the walls of the alignment sleeve is obtained in practice by placing the internal walls of this latter at a very precise distance from the external cylindrical envelope of said sleeve. When the sleeve is molded, it is usually necessary to provide walls having substantially constant thicknesses at the level of the V-groove in order to obtain good surface flatness.

Mounting of the plugs is carried out by means of two threaded portions 34 each formed at one end of the union 10 and the locking rings 5 are screwed on said threaded portions. The annular flange 30 of each plug body 1 is clamped against the end of the union 10 by the annular flange 33 of the corresponding locking ring 5, with the result that the plug body 1 is rigidly attached to the union 10, any take-up of play being performed solely by the floating terminal 2.

Referring more particularly to FIG. 9, it will be observed that the resilient tongue 15 is provided with a lateral clearance j, k within the guiding and locating groove 13, thus making it possible in particular to ensure self-centering of said tongue 15 with respect to the semicircular face of the terminal after this latter has been introduced in the sleeve 14. Said self-centering action ensures symmetry of the forces applied to each terminal. Said lateral clearances j, k and h also permit easy introduction of the alignment sleeve provided with its resilient tongue 15 within the union at the time of assembly of the device in accordance with the invention and prior to fastening by means of the screw 28. When the sleeve 14 is formed of molded plastic material, it is preferable to ensure that the screw 28 is not tightened too hard in order to prevent bowing of the sleeve. The screw 28 is then locked in position by pouring a thermosetting resin into the hole 27.

The plug body 1, the attachment terminal 2, the limiter 4, the locking ring 5, the rear nut 8 as well as the alignment sleeve 14 and the union 10 can be made simply of molded plastic material in spite of the precision required for alignment of the optical fibers. Thermoplastic materials commonly employed for molding such as the polyamides, polycarbonates, polysulfones, and so on, are well-suited to these assemblies. In the example of construction under consideration, the resilient tongue is fabricated from a flat strip of metal.

The invention is not limited to the embodiments described in the foregoing. Thus it is quite feasible to design the ferrule 6 and the limiter 4 as a single part. Furthermore, crimping of the cable as shown in FIG. 5 is only one of the possible modes of assembly. Thus the jacket or sheath of any type of cable can be mounted within the plug by means of techniques which are well-known to those versed in the art.

What is claimed is:

1. An optical-fiber connector plug which is intended to be mounted on a coupling member and comprises:
    an attachment terminal in which at least one optical fiber is accurately positioned at one end;
    a hollow open ended plug body;
    means associated with said attachment terminal and said plug body and adapted to cooperate in such a manner as to maintain said attachment terminal as a floating terminal assembly with a degree of freedom of movement along a longitudinal axis thereof within said plug body; and
    a resilient restoring member adapted to abuttingly apply said terminal against a downstream end of said plug body,
    wherein said means to maintain said attachment terminal comprise a plurality of locating keys arranged at the downstream end of the plug body and a corresponding number of grooves formed in the terminal, said grooves being shaped to accept said keys and each having a circumferential width greater than that of a corresponding one of said keys so that said terminal also has a limited degree of freedom of rotation about said axis thereof, wherein the plug body is also provided with at least a first locating element for angularly orienting the plug body within the coupling member, and wherein said plug body includes means to cooperate with a locking device for rigidly mounting said plug body on said coupling member.

2. A plug according to claim 1, wherein the attachment terminal has an upstream annular flange which provides said terminal with an abutment for the locating keys of said plug body and which is extended by said grooves.

3. A plug according to claim 1 or claim 2 including a limiter and a rear nut, said limiter including means for locking said limiter within said plug body by said rear nut, wherein the resilient restoring member is a spring compressed within the plug body by said limiter.

4. A plug according to claim 3, including a cylindrical ferrule for holding a jacket of a fiber, said ferrule being providing with a locking flange which is locked within the plug body by said rear nut.

5. A plug according to claim 4, wherein the ferrule is associated with an internal cylindrical sleeve through which a bore thereof the fiber jacket is passed and around which is folded an element of the fiber jacket which affords resistance to traction, said ferrule and said internal sleeve being crimped together.

6. A plug according to claim 1, wherein the locking device is an internally threaded locking ring which is intended to be screwed on the coupling member, said locking ring being provided with an internal annular flange upstream of said internal threads, said annular flange being applied against an annular flange of the plug body in the locking position.

7. A plug according to claim 1, wherein the attachment terminal is provided with a V-section alignment element.

8. A connector, wherein said connector comprises two plugs according to claim 1 and a coupling member comprising alignment means rigidly fixed within a cylindrical coupling body, said cylindrical coupling body being provided at each end with a screw-thread for screwing said locking device, and at least a second locating element which is complementary to and cooperating with the first locating element in order to locate and guide the plug within the coupling member.

9. A connector according to claim 8, wherein the alignment device is provided with two V-section elements and with resilient restoring means for applying corresponding V-section elements of each attachment terminal against those of said alignment device.

10. A connector according to claim 8 or claim 9, wherein the alignment device is a sleeve mounted within the coupling body.

11. A connector according to claim 10, wherein the coupling body is constituted by a union in which is placed an alignment sleeve having a groove of V-shaped cross-section which is adapted to cooperate with each coupling terminal, the ends of the side walls of the V-groove being joined to each other so as to form a cavity having a shape which is substantially complementary to the shape of the corresponding attachment terminal, resilient means being arranged within the alignment sleeve in substantially overhead relation to the bottom of said V-groove so as to apply each attachment terminal against the bottom of the groove of said alignment sleeve.

* * * * *